Aug. 9, 1960  G. MUFFLY  2,948,467
FUNCTION UNIT
Filed Dec. 31, 1956  3 Sheets-Sheet 1

INVENTOR.
Gary Muffly
BY
ATTORNEY ÷

United States Patent Office 2,948,467
Patented Aug. 9, 1960

2,948,467

FUNCTION UNIT

Gary Muffly, Oakmont, Pa., assignor to Gulf Research & Development Company, Pittsburgh, Pa., a corporation of Delaware Filed Dec. 31, 1956, Ser. No. 631,726

6 Claims. (Cl. 235—61.6)

This invention concerns an improved function unit and more particularly pertains to a device for effecting rotation of an output shaft so that its rotation bears a desired functional relationship to the angular rotation of an input shaft.

In controlled devices, computers, servo-mechanisms, remote indicators, automatic mechanisms and the like, it is often necessary to employ devices for varying one quantity as a function of some other quantity. As a well known example, a cam or crank is often employed to convert a uniform rotary motion into a non-uniform linear displacement. Another example is a tapered slide-wire resistance which can convert a linear or angular displacement into a voltage change which follows a desired law. Such devices may be termed function units and they are often employed in computing machines. A function unit may be defined as a device which can store a functional relationship and release it when required. It has some form of input, each value of which produces a particular value of output. The relationship between input and output may be in the same or different forms such as displacement, rotation, voltage, pressure, etc.

The apparatus of this invention comprises a novel type of function unit which may be used for any of the purposes suggested above. While described herein as a computer element in which the input and output are in the form of rotations, this is by way of example only, and the apparatus may be employed wherever an output and input are related by a functional relationship which is single valued in the range employed. In computing machines this invention may replace such elements as cams, nonlinear potentiometers, eccentrics, special gears, nonlinear variable capacitors, etc. An important advantage of this invention is that the function unit may be made from 10 to 100 times more accurate than heretofore known function elements. A further advantage of this invention is that the accuracy is more uniform than prior devices and this makes the invention particularly advantageous for use with functions which have a high degree of non-linearity. A still further advantage of this invention is that the tape length required to attain a predetermined degree of accuracy is greatly reduced.

This invention is described in this specification, of which the drawings form a part, and in which Figure 1 is a schematic diagram of the function unit of this invention;

This invention in one embodiment comprises a magnetized tape which is driven from the input shaft through a differential gearing. The magnetic tape carries two magnetized record tracks on which are recorded quadrature signals that are picked up by means of special magnetic transducing heads. The quadrature signals are amplified and employed to drive a two-phase servo motor which drives the output shaft. The magnetized tape is in this manner employed to control the output motor whereby the motor rotation is synchronized to the tape signals regardless of tape speed or direction. The output drive is also connected through a gear ratio to the other shaft of the differential in such direction as to be additive in its effect on the tape drive, thereby introducing a form of mechanical feedback. The invention further contemplates the generation of a magnetized tape whereby any desired function or arbitrary control program may be recorded and subsequently reproduced by the function unit herein described.

Figure 1:
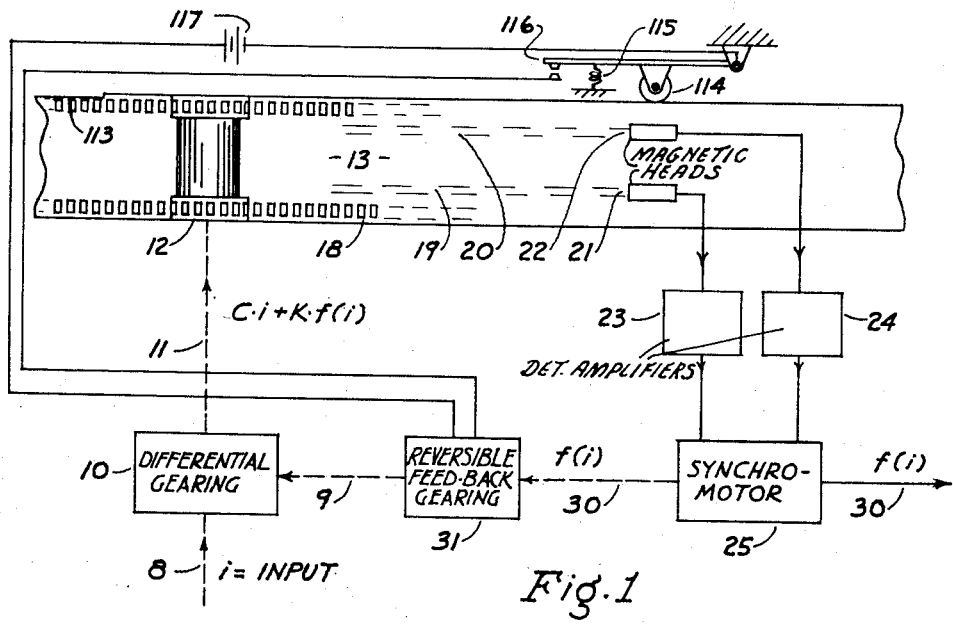

A simplified embodiment of the invention is schematically illustrated in Figure 1, wherein 13 represents an elongated magnetizable record medium having sprocket holes 18 which are engaged by the teeth of sprocket wheel 12. The sprocket 12 is driven by a sprocket shaft 11 which connects the sprocket to differential gearing 10. The differential gear 10 is driven by two shafts 8 and 9 arranged so that the motion of shaft 11 is proportional to the sum of two quantities which are respectively proportional to the motions of shafts 8 and 9. Accordingly, if shaft 9 were held fixed the motion of shaft 11 would be proportional to the motion of shaft 8 and the tape 13 would be moved longitudinally by an amount also proportional to the rotation of shaft 8. Rotation of shaft 8 is the independent variable which is the input to the function unit.

The magnetic tape 13 has two magnetized record tracks 19 and 20. The manner in which these record tracks are generated will be explained later. The record tracks 19 and 20 are magnetized so that a pair of electromagnetic transducing heads 21 and 22 engaging the tracks will pick up the recorded signals. The track signals are in quadrature and therefore the respective signals picked up by the two heads are 90° out of phase. The structure of the magnetic reproducing heads 21 and 22 and the manner in which the reproducing heads 21 and 22 cooperate with the tracks 19 and 20 is clearly described in Muffly Patent 2,832,839. The picked-up signals are respectively fed to two detector-amplifiers 23 and 24 whose output power drives a two-phase synchro-motor 25. The manner in which the amplified signals from the tracks 19 and 20 are employed to drive the synchro-motor 25 is well known in the art.

The synchro-motor 25 has an output shaft 30 whose rotation represents the dependent variable. The output shaft 30 is also coupled to one of the input shafts 9 of the differential gearing 10, such coupling preferably being through gearing 31. The gearing 31 is preferably made reversible and the purpose of the reversing feature will be described later.

Operation of the device of Figure 1 is therefore as follows. Rotation of shaft 8 causes corresponding rotation (except as modified by the differential 10) of shaft 11 which effects longitudinal motion of the tape 13. The signals on tape 13 are then picked up and drive the synchronous motor 25 whose output appears at shaft 30. The output is also modified by gearing 31 and fed back to the differential 10. Accordingly the actual motion of tape 13 is proportional to the input rotation 8 plus some factor times the output rotation 30. It is apparent that if the function recorded on the magnetic tracks 19 and 20 changes very slowly the tape motion is very nearly proportional to the change of input. On the other hand if the function changes rapidly, then the tape motion is also increased (speeded-up) by an added amount which is proportional to the change of output. By the use of this invention a relatively low tape speed may be employed in the slowly-changing regions of the function, and the apparatus automatically speeds up the tape in the rapidly-changing regions of the function.

Figure 2:
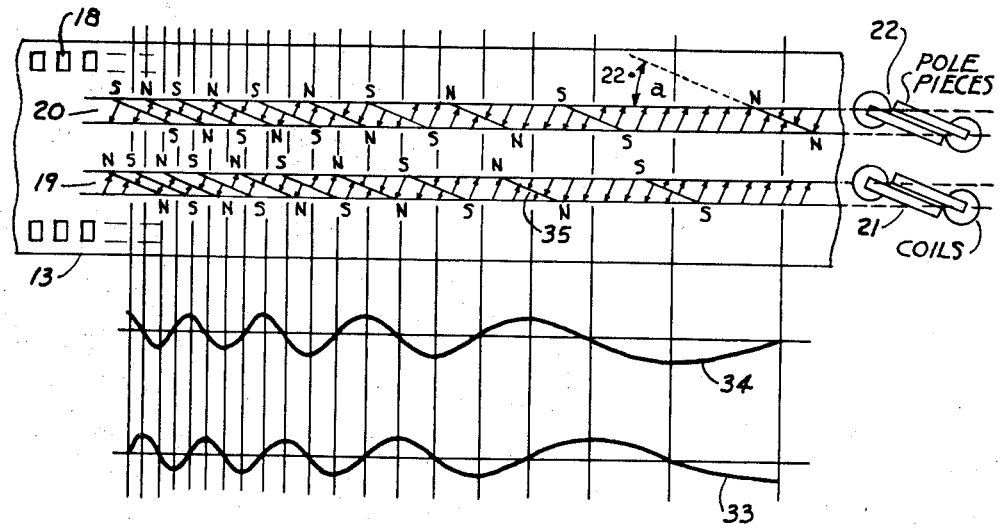
Figure 2 shows a diagrammatical representation of the magnetized portions of a magnetizable tape employed in the apparatus of this invention.

Figure 2 illustrates diagrammatically the magnetization of the tape 13. The figure shows the tape 13 with sprocket holes 18 and the two magnetic tracks 19 and 20 as they would look if certain of their features could be made visible. The pole pieces and coils of the heads 21 and 22 are indicated at the right of the figure. In accordance with the recording system of the aforementioned U.S. Patent 2,832,839, the pole faces of the heads are oriented so as to make an angle of about 22° with the direction of motion of the tape 13. When magnetized by means to be explained later, the tracks will have N and S pole areas similar to those indicated on the tracks 19 and 20. Figure 2 shows the flux directions in the tracks by means of arrows, and the diagonal lines 35 perpendicular to these arrows represent the center line of areas containing respectively the indicated N and S magnetic poles. The tracks 19 and 20 pictured in Figure 2 show the angular magnetization of the tracks which results from the heads being oriented at an angle in accordance with the teachings of U.S. Patent 2,832,839. The magnetic record pictured is one of rapidly-changing wavelength. Also shown is the phase displacement of 90° (or ¼ wavelength) between the related waves on tracks 19 and 20. The waves as they would be reproduced are drawn in the lower part of Figure 2, wave 33 corresponding to the signal or flux from track 19, and wave 34 corresponding to the signal or flux from track 20. When, as the tape 13 moves, one of the lines 35 is centered over the air gap of the associated head, both pole tips of the head are adjacent to tape areas of like polarity and no flux circulates around the core of the magnetic head. (At this point the tape magnetization is zero and reverses direction.) However, when the air gap is centered midway between two lines 35, the pole tips of the head are in contact with tape areas of unlike polarity and the flux through the core is a maximum which results in maximum response from the head. (At this point the tape is magnetized most strongly.) The response amplitude is picture in curves 33 and 34 for the respective heads 19 and 20 when traversed by tape 13. It is desirable that the recorded sine waves be reproduced with reasonably good wave form and that they are everywhere about 90° apart in phase so that the output motor (25, Figure 1) will run smoothly.

Figure 3:
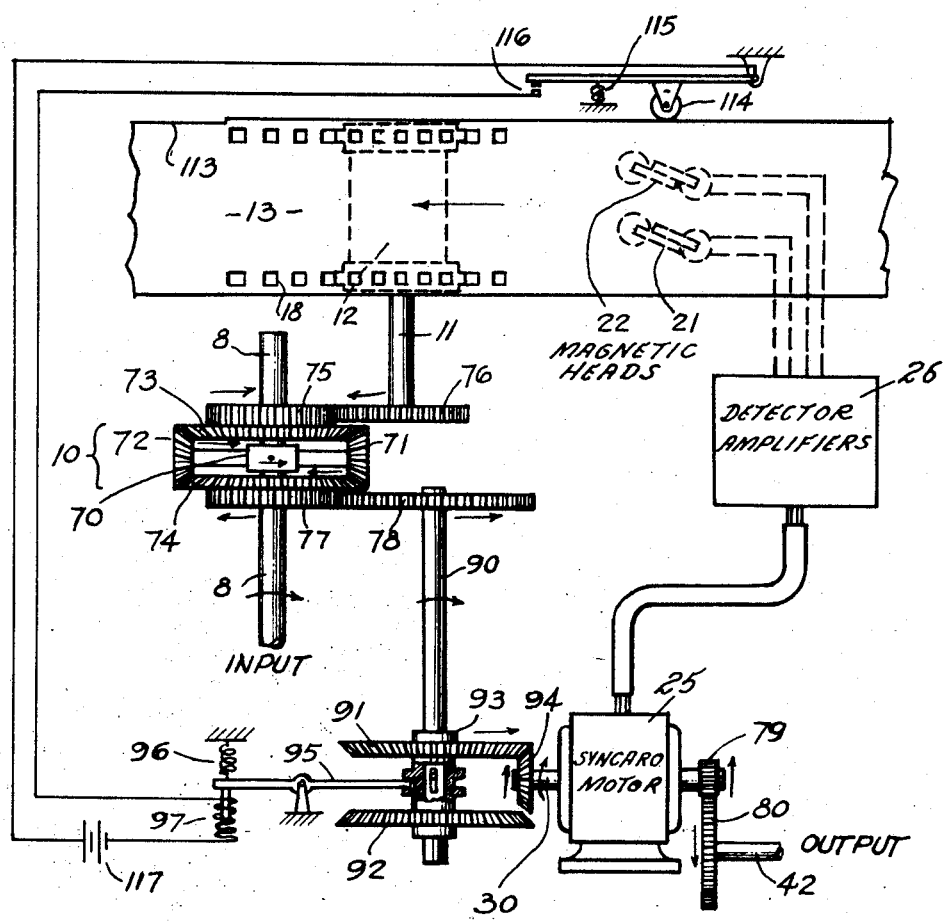
Figure 3 is a diagrammatical view of the apparatus.

Figure 3 illustrates a physical embodiment of the apparatus of Figure 1. A differential gearing is indicated generally by 10. The spider 70 of the differential is pinned to the shaft 8 which is the input shaft of the function unit. The spide 70 carries the customary planet gears 71 and 72 which mesh with gears 73 and 74. The gears 73 and 74 are both free to rotate on shaft 8. Gear 73 has fastened to it a spur gear 75 which meshes with gear 76 fastened to shaft 11. Gear 74 has fastened to it a spur gear 77 which is driven through spur gear 78, the latter being fastened to an intermediate shaft 90. Intermediate shaft 90 carries a reverse-gear assembly comprising two similar bevel gears 91 and 92 both of which are fastened to a sliding bushing 93 which engages the intermediate shaft 90 by means of splines or a pin and slot as shown. The gears 91 and 92 are so spaced on the bushing 93 that only one or the other of the gears 91 and 92 can mesh with the bevel gear 94 driven by the shaft 30 of a synchro-motor 25. The position of a control arm 95 determines which of the gears 91 or 92 meshes with the motor gear 94, and a tension spring 96 acting on the arm normally holds gear 91 in mesh so as to provide drive in a directional relationship which may be called normal. Under certain conditions which will become evident later, this directional relationship is reversed. This is accomplished by a solenoid 97 energized by battery 117 and under control of contacts 116. Where the directional relationship is to be reversed, some char- acteristic of the tape is changed, for example its width as illustrated at 113. Whenever the roller 114 contacts the narrower part 113 of the tape 13, the contacts 116 close and the resulting energization of solenoid 97 overcomes the pull of spring 96 to move the control arm 95, thereby shifting the gears 91 and 92 so that gear 92 meshes with 94 thus reversing the relative rotations of shafts 30 and 90.

The synchro-motor 25 has a polarized rotor whose polarization is effected either by a built-in permanent magnet or by energizing a wound rotor with D.C. The stator of synchro-motor 25 has a two-phase winding whose phase coils are respectively energized by the amplified tape signals. The synchro-motor 25 acts as a synchro-repeater, but its operation is somewhat different from that of the common type of A.-C. operated synchro-repeater. The snychro-motor 25 drives the output shaft 42 through gears 79 and 80 or alternatively the motor shaft 30 itself may be used as the output.

It is apparent that if gear 74 (or 77) is held stationary then the gear 73 (and 75) will rotate through twice the angle of input shaft 8. If gear 74 (and 77) is also rotated, then the rotation of gear 73 (and 75) will be proportional to the algebraic sum of two quantities which are respectively proportional to the motions of shaft 8 and gear 77.

The sprocket shaft 11 drives the sprocket 12 which meshes with the perforations 18 in magnetic record tape 13. In the figure the sprocket is shown underneath the tape. The magnetic transducing heads 21 and 22 also shown underneath the tape are shown set at an angle with respect to the motion of the tape in accordance with the teachings of aforementioned U.S. Patent 2,832,839. The heads 21 and 22 are A.-C. excited and are connected to an electronic oscillator and a pair of detector-amplifiers (indicated collectively by 26) from whose output the synchro-motor 25 is driven.

The normal directions of motion of the various parts are as shown by means of arrows in Figure 3 when the independent and the dependent variables are both increasing. A clockwise rotation of input shaft 8 effects clockwise rotation of the spider 70 which in turn effects clockwise rotation of gear 73 (if gear 74 were held) and thus effects counterclockwise rotation of shaft 11. The tape 13 is thus moved toward the left in Figure 3. The electrical connections to synchro-motor 25 are such as to effect counterclockwise rotation of gear 94 under normal conditions (contacts 116 open), so that gear 94 meshes with gear 93 and effects clockwise rotation of shaft 90 when the dependent variable is increasing. Obviously these motions reverse when the input is reversed. The machine will run in either direction.

The above directions (or the reverse of all of them) may be considered normal and are those which occur when the roller rides on wide tape with contacts 116 open. Under certain conditions to be explained later the relative rotations of shafts 30 and 90 are reversed for a special purpose.

Through the gears 94, 93, shaft 90 and gear 78 the counterclockwise rotation of the motor shaft 30 causes the differential gear 74 (and 77) to rotate counterclockwise in proportion to the output rotation. This motion of gear 74 feeds back additively to the motion of input shaft 8 so that the total rotation of gear 73 (hence also shaft 11) is more than it would have been if gear 74 had not moved. Therefore the rate of gears 75 and 76 may be so coordinated with the number of teeth on sprocket 12, that for a stationary or very slowly-moving output (with respect to a unit change of input) the tape speed is a convenient value, and upon reaching a place in the range of the recorder function where the output moves rapidly (with respect to a unit change of input) the shaft 11 will be speeded up, whereupon the tape will be moved faster. This spreads out the signal impulses on the tape where they would otherwise be tightly bunched. The expansion increases the accuracy or resolution as well as the reliability of the function unit in this region over what would be obtained without the feedback. The apparatus thereby permits using relatively shorter wavelength tape signals for the slowly-changing regions of the function and it automatically expands the tape signals for the more rapidly-changing regions of the function, thereby maintaining a high degree of accuracy throughout the tape but without need for an unduly long tape. The apparatus in this manner distributes the changes in the function more evenly over the entire tape and thereby uses the tape more efficiently from the standpoint of accuracy.

Inasmuch as the motion which is coupled from the output back to the input is a form of mechanical feedback, it is necessary that the apparatus and the functions for which it is to be used be of such form that stability shall be maintained. The stability criterion is most conveniently studied from a mathematical analysis of the tape motion. Referring to Figure 1, let $i$ be the input and $f(i)$ be the output, where $f$ represents the functional relationship between input and output. It is of course necessary that both $i$ and $f(i)$ be real (not imaginary) and also that $f(i)$ be single valued for the region of the function over which the apparatus is to be used. Let L be the tape displacement (in inches) for an input value $i$ corresponding to an output $f(i)$. We can then describe the action on the differential 10 as $L=Ci+K.f(i)$ where C is the amount of tape motion that would be caused by a unit of input if the shaft 9 were clamped, and K is the amount of tape motion that would be caused by a unit of output from shaft 30 if the shaft 8 could be clamped. The constant C is determined by the sprocket 12 dimensions as well as the gear ratio through the differential 10 from shaft 8 to shaft 11. The constant K is determined by the sprocket 12 dimensions, the gear ratio through the differential 10 from shaft 9 to shaft 11, and the ratio of feedback gearing 31 (Figure 1).

The rate of change of L can be determined by differentiating the above equation with the result $$dL = C\,di + K\,df(i)$$

from which $$\frac{dL}{di} = C + K\frac{df(i)}{di} \text{ or } \frac{di}{dL} = \frac{1}{C + K\frac{df(i)}{di}}$$

It is apparent that the criterion for stability is that $$\frac{dL}{di}$$

shall not be zero and shall always have a finite value, since otherwise the feedback will cause the tape to stall if $$\frac{dL}{di} = 0$$

or to run away if $$\frac{dL}{di}$$

becomes infinite. It is apparent that if C and K are always positive values, $$\frac{dL}{di}$$

is always finite and not zero so long as $$\frac{df(i)}{di}$$

remains finite and positive. The quantity $$\frac{df(i)}{di}$$

is the slope of the recorded function. Therefore the apparatus as described will be stable over all values of $i$ for which the slope of the curve of $f(i)$ (output) plotted against $i$ (input) is positive and not infinite.

The value of $$\frac{dL}{di}$$

is still finite and positive when $$\frac{df(i)}{di}$$

is negative provided its absolute value is less than C/K. An equivalent way of expressing this is that the algebraic value of $$K\frac{df(i)}{di}$$

must be greater (i.e. more positive) than C multiplied by $(-1)$.

For regions of the curve of $f(i)$ where the slope is negative, the action of the apparatus as so-far described is to accentuate non-linearity rather than to alleviate it, and therefore its application in this region is limited to special curves of which the greater part of the useful region of the function has a positive slope and only a relatively small region of limited negative slope is to be included. Of course the values of C and K may be made such as to accommodate as much of the negative-slope region as is desired.

In the event that it is necessary to work with a function that has both positive and negative slopes of high value the above limitation arising from stability considerations may be circumvented by arranging the gearing 31 to be reversed whenever the slope of the function reverses. By such means the algebraic sign of K is changed at the appropriate point so that operation is always in a stable region. One way in which the reversal is automatically accomplished is illustrated diagrammatically in Figure 1. The tape 13 is made somewhat narrower as illustrated at 113 (Figure 1) over the region where the slope of the recorded function $$\left(\frac{df(i)}{di}\right)$$

is negative. A roller 114 rides against the edge of the tape and is held in contact with the edge of the tape by spring 115. The roller 114 actuates a contact 116 which is so arranged that the contact is open over the region where the tape 13 is of normal width, and the contact 114 closes when the roller rides on the narrower tape at 113. Closure of the contacts 116 completes an electric circuit from battery 117 to a solenoid (not shown in Figure 1) in the reversible gear unit 31 and reverses the direction of the feedback gearing. By this means the apparatus is made stable for all values of $$\frac{df(i)}{di}$$

that are not infinite. The reversal of gearing 31 is easily accomplished because it takes place at a point where $$\frac{df(i)}{di}$$

is zero (i.e. changing from positive to negative) which means that the output $f(i)$ is going through a maximum or a minimum and hence the shafts 30 and 9 are at a standstill.

Figure 3 illustrates a physical embodiment of one type of reversible gearing and this has already been described. In Figure 3, closure of contacts 116 effects energization of solenoid 97 which reverses the relative rotation of shafts 30 and 90 without however changing their speed ratio.

In this manner the sign of the feedback constant K is automatically changed so that the term $$K\frac{df(i)}{di}$$

is always positive whereby the apparatus is always maintained in the region of stable operation.

The method and apparatus employed to record a given function on the tape may now be described with reference to Figure 4.

Figure 4:
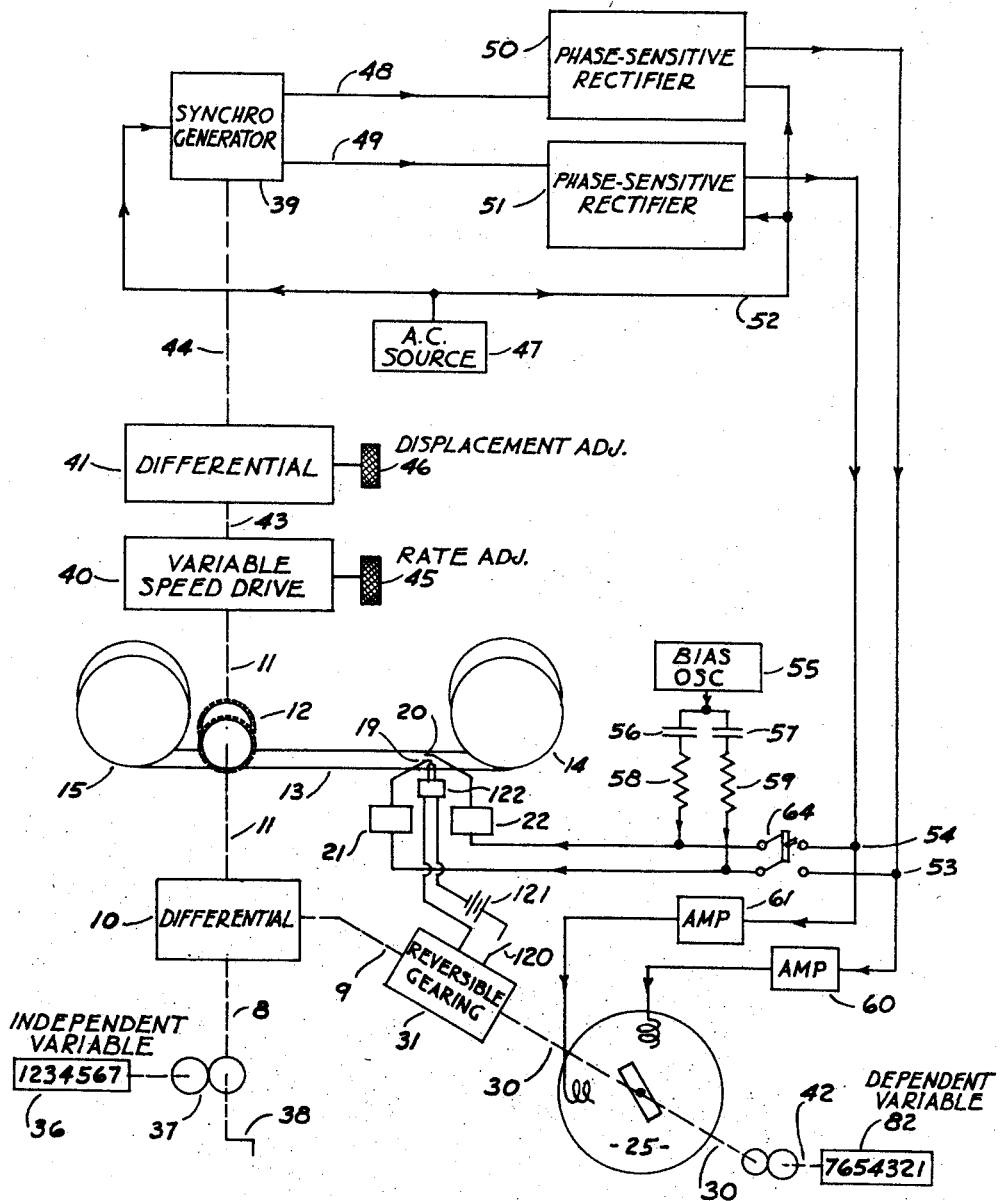
Figure 4 is a block diagram of an apparatus which may be employed to produce a function tape of the type employed in Figures 1 and 3 of this invention.

The apparatus for making the function tape is shown in Figure 4 in block diagram form, the tape 13 being shown longitudinally positioned by rotation of the sprocket 12 fastened to shaft 11. The input shaft 8 is turned by a crank 38 or other convenient means and drives the shaft 11 through the differential gearing 10. The tape is stored wound on the drums 14 and 15 which are respectively driven by torque motors (not shown) to maintain the tape 13 wound up and taut as it traverses the magnetic recording heads 21 and 22 indicated diagrammatically only. An input counter 36 is geared to the input shaft 8 with gears 37 of appropriate ratio so that the counter 36 reads the independent (input) variable to the desired precision. The shaft 11 is also connected to rotate a synchro-generator 39 through a continuously-adjustable variable-speed drive 40 having adjustment knob 45, and through a differential 41 whose third shaft has an adjustment knob 46. Rotation of shaft 11 is thus converted into rotation of shaft 43 with the driving ratio under the control of rate knob 45 which is preferably calibrated. The shaft 43 drives shaft 44 through a differential gearing 41 so that additional displacement may be added or subtracted to the motion in passing through the differential, the displacement added or subtracted being introduced by turning displacement knob 46. The units 40 and 41 are well known mechanical devices and they should be well constructed without backlash or other mechanical defects. Unit 40 may be a ball-and-disk drive and unit 41 may comprise planetary type gearing. By these means the shaft 44 is rotated at a predetermined ratio with respect to shaft 11, but the operator may make adjustments in the ratio by adjusting rate knob 45 and the operator may also introduce small displacements by turning displacement knob 46.

The synchro-generator 39 is of a type well known to the art and is sometimes called a synchro-transmitter. Its primary is excited at a fixed A.-C. voltage from A.-C. source 47. Its secondary has two windings in quadrature and these deliver voltages which are proportional to the primary voltage multiplied respectively by the sine and cosine of the angular position of the rotatable member (usually the primary) which is mechanically connected to shaft 44. The secondary voltages are delivered on leads 48 and 49 respectively and fed into phase-sensitive rectifiers 50 and 51 of known type. The rectifiers 50 and 51 are identical and both are excited (sensitized) by a reference voltage from the A.-C. source 47 as indicated by lead 52. The voltages obtained from the respective rectifiers at points 53 and 54 therefore have polarity and instantaneous values which are proportional respectively to the sine and cosine of the angular position of shaft 44. The voltages at 53 and 54 reverse in polarity when the sine and cosine change sign. Furthermore, the values of the voltages remain fixed (like a D.-C.) so long as the shaft 44 remains in a fixed angular position, and the voltages at 53 and 54 change only when the angular position of shaft 44 changes. The circuit comprising A.-C. source 47, synchro-generator 39, and the phase-sensitive rectifiers 50 and 51 are the means for obtaining such sine and cosine voltages, and it is within the purview of this invention to employ other known equivalent means which produce such sine and cosine voltages in response to the angular position of a shaft (44).

The sine and cosine voltages delivered at points 53 and 54 are recorded on the tape 13 by means of the two magnetic heads 21 and 22 engaging the respective tracks 19 and 20. For high recording fidelity a high-frequency bias from oscillator 55 may be introduced through condensers 56 and 57 and resistors 58 and 59 as is customary in the magnetic-recording art, the bias frequency being sufficiently high so that it does not record as such on the tracks but merely serves to prevent distortion of the wave shapes. The magnetic tracks 19 and 20 are thus magnetized and each 360° rotation of rotatable transformer 39 will produce on the tape 13 a pair of sinusoidal waves each one cycle long but with 90° phase difference between them.

The voltages at points 53 and 54 are respectively amplified by the conventional amplifiers 60 and 61 which are capable of amplifying D.-C. signals as well as very low frequencies. The amplified signals are then fed to the quadrature coils of a 2-phase synchro-repeater or synchro-motor 25 which is in all respects similar to the motor 25 of Figures 1 and 3. It is convenient to combine the apparatus of Figures 3 and 4 into a single apparatus in which event the synchro-motor 25 of Figure 4 may in fact be the same as motor 25 of Figure 3, suitable switching means being provided so that the motor performs its proper function at the proper time. Rotation of motor 25 is proportional to the value of the dependent variable, and the latter may be indicated by a counter 82 connected to the motor by gearing (79 and 80 of Figure 3) to provide the desired precision.

The shaft 30 of the synchro-motor 25 is also connected through the feedback gearing 31 to shaft 9 which enters the differential 10. The rotations are arranged so that whenever the slope of the recorded function $$\frac{df(i)}{di}$$

is positive, a positive rotation of shaft 30 would effect positive rotation of shaft 11 if the input shaft 8 were held fixed. In this manner the rotation of shaft 11 and the resulting motion of tape 13 is proportional to the sum of two quantities which are respectively proportion to the motions of shafts 8 and 9.

A switch 64 is provided in the recording circuit so that the operator is able to monitor the functional relationship between the counters 36 and 82 with switch 64 open prior to actual recording. The desired relationship is obtained by adjusting the rate knob 45 and the knob 46. When the relationship is as desired, the operator can close switch 64 and record that part of the tape covering the range of values over which he has obtained a fit. If the slope of the function changes (as it will in general) the operator can adjust the rate knob 45 so as to maintain the correct slope. In this manner the tape 13 may be magnetized a section at a time, each region of the function represented being first checked by the operator and the recording made when proper adjustments have been achieved.

If a mistake is made, the erroneous part of the tape may be erased by means of the same heads 21 and 22 using known erasing techniques, after which the corrected function is recorded in its place. However, with a little practice an operator can record an entire function with little or no backtracking. Obviously, counter 82 must be capable of indicating errors of inconsequential size so that errors can be detected before they become significant. Whenever the least observable change from the desired function takes place, the operator may correct the dependent variable being recorded by turning the displacement knob 46. The displacement knob 46 should never be changed by more than a small fraction of a wavelength at a time, as otherwise the synchro-motor 25 will jump undesirably whenever the discontinuity on the tape is passed during subsequent operation of the unit. A shift of knob 46 corresponding to 10 or 20 degrees motion of the synchro-motor can be tolerated and the motor will follow smoothly enough. The differential 41 with displacement knob 46 is not essential to the apparatus, but is useful in preventing overadjustment of rate knob 45 when trying to track the desired function. The knob 46 gives a quicker correction with less tendency to overshoot whenever it becomes apparent to the operator that he is drifting from the desired curve.

In the apparatus of Figure 4, the automatic reversal of the feedback gearing 31 is manually performed by the operator during the recording process. Since the function being recorded is known to the operator he will from a plot of the function know where the slope $$\frac{df(i)}{di}$$

changes from positive to negative and vice versa. When a change from positive slope to negative slope occurs, the operator closes switch 120 and when the slope again becomes positive the operator opens switch 120, thus maintaining the switch 120 closed over the negative-slope regions of the function. The switch 120 completes a circuit through battery 121 which actuates the reversing mechanism of the feedback gearing 31 as described in reference to Figure 3. The circuit also actuates a cutter 122 adjacent the edge of the tape 13 so that the cutter 122 cuts the tape to make it slightly narrower (as at 113 shown in Figures 1 and 3). The part of the tape with reduced width later controls the automatic reversal of the feedback gearing as previously explained.

It should be noted that the signals of record tracks 19 and 20 correspond to the rotation of motor 25 but they do not themselves express the functional relation to the input (rotation of shaft 8) because the latter is modified by the feedback introduced by rotation of shaft 9.

The apparatus of this invention has been described using a two-phase system, but three or even more phases can be used if desired. In generating a tape with three tracks the synchro-generator 39 of Figure 4 will have three secondary windings which will deliver voltages 120° apart. Those will be separately rectified by means of three phase-sensitive rectifiers and the three component voltages are fed to three recording heads and also monitored by means of a three-phase synchro-motor. Such a three-phase system has the advantage of more accurate synchronization of the output motor with the magnetic tracks, thereby further improving the accuracy of the device. In the appendant claims, the connecting means transmitting motion from one shaft to another are understood to transmit motion from either shaft to the other and in linear proportion such as is effected by common gearing, including also a one-to-one proportionality of motion which alternatively may be effected by a direct connection as is well known.

Certain aspects of this invention are claimed in divisional application Serial Number 749,575, filed July 8, 1958, which is assigned to the same assignee as the present application.

What I claim as my invention is:

1. Apparatus in which motion of an output shaft bears a predetermined functional relationship to motion of an input shaft comprising an input shaft whose rotation represents values of an independent variable, an output shaft, whose rotation represents values of a dependent variable, an elongate magnetizable record tape, means for longitudinally moving said record tape including a differential motion-combining means transmitting motion from said input shaft to said record tape and additively transmitting motion from said output shaft to said record tape, at least two magnetic record tracks on said record tape, said record tracks respectively comprising signals representative of vector components of the desired rotation angle of said output shaft when the rotation angle of the output shaft is related to the rotation angle of said input shaft by a predetermined function, at least two transducing means traversed by said record tape and respectively responsive to said record tracks and respectively producing electric signals whose intensity is proportional to the vector components recorded on said record tracks, a synchro-motor having multiphase windings, means respectively electrically connecting each of said transducing means to a phase winding of said synchro-motor, and means transmitting motion from said synchromotor to said output shaft.

2. Apparatus in which motion of an output shaft bears a predetermined functional relationship to motion of an input shaft comprising an input shaft whose rotation represents values of an independent variable, an output shaft whose rotation represents values of a dependent variable, an elongate magnetizable record tape, means for longitudinally moving said record tape including a differential motion-combining means transmitting motion from said input shaft to said record tape and additively transmitting motion from said output shaft to said record tape, two magnetic record tracks on said record tape, said record tracks respectively comprising signals representative of the sine and cosine of the desired rotation angle of said output shaft when the rotation angle of the output shaft is related to the rotation angle of said input shaft by a predetermined function, at least two transducing means traversed by said record tape and respectively responsive to said record tracks and respectively producing electric signals whose intensity is proportional to the sine and cosine signals recorded on said record tracks, a two-phase synchro-motor, means respectively electrically connecting each of said transducing means to a phase winding of said synchro-motor, and means transmitting motion from said synchro-motor to said output shaft.

3. Apparatus in which motion of an output shaft bears a predetermined functional relationship to motion of an input shaft comprising an input shaft whose rotation represents values of an independent variable, an output shaft whose rotation represents values of a dependent variable, an elongate magnetizable record tape, means for longitudinally moving said record tape including a differential motion-combining means transmitting motion from said input shaft to said record tape and additively transmitting motion from an intermediate shaft to said record tape, at least two magnetic record tracks on said record tape, said record tracks respectively comprising signals representative of vector components of the desired rotation angle of said output shaft when the rotation angle of the output shaft is related to the rotation angle of said input shaft by a predetermined function, at least two transducing means traversed by said record tape and respectively responsive to said record tracks and respectively producing electric signals whose intensity is proportional to the vector components recorded on said record tracks, a synchro-motor having multiphase windings, means respectively electrically connecting each of said transducing means to a phase winding of said synchro-motor, means transmitting motion from said synchro-motor to said output shaft, and means transmitting motion from said output shaft to said intermediate shaft with a ratio such that the motion-transfer ratio from the synchro-motor to the record tape multiplied by the slope of the recorded function has an algebraic value greater than the motion transfer ratio from the input shaft to the record tape multiplied by minus one.

4. Apparatus in which motion of an output shaft bears a predetermined functional relationship to motion of an input shaft comprising an input shaft whose rotation represents values of an independent variable, an output shaft whose rotation represents values of a dependent variable, an elongate magnetizable record tape, means for longitudinally moving said record tape including a differential motion-combining means transmitting motion from said input shaft to said record tape and additively transmitting motion from an intermediate shaft to said record tape, at least two magnetic record tracks on said record tape, said record tracks respectively comprising signals representative of vector components of the desired rotation angle of said output shaft when the rotation angle of the output shaft is related to the rotation angle of said input shaft by a predetermined function, at least two transducing means traversed by said record tape and respectively responsive to said record tracks and respectively producing electric signals whose intensity is proportional to the vector components recorded on said record tracks, a synchro-motor having multiphase windings, means respectively electrically connecting each of said transducing means to a phase winding of said synchro-motor, means transmitting motion from said synchro-motor to said output shaft, reversible means transmitting motion from said output shaft to said intermediate shaft, and means for reversing said reversible means whenever the slope of the functional relationship is negative.

5. Apparatus in which an output motion bears a predetermined functional relationship to an input motion comprising an elongatae magnetizable record medium, at least two magnetized record tracks on said record medium, each of said tracks comprising magnetic variations representative of a different vector component of a multi-turn rotary motion that is predetermined with respect to position along the record medium, a transducing means for each said record track responsive to the magnetization at any position thereof and producing electric signals proportional to said magnetic variations, a multiphase synchro-motor, means for applying each of said electric signals to a corresponding phase of said synchro-motor, output means driven by said synchro-motor, and means driving said record medium in proportion to the sum of two quantities that are respectively proportional to the input motion and proportional to the synchro-motor output motion.

6. Apparatus in which an output motion bears a predetermined functional relationship to an input motion comprising an elongate magnetizable record medium, at least two magnetized record tracks on said record medium, each of said tracks comprising magnetic variations representative of a different vector component of a multi-turn rotary motion that is predetermined with respect to position along the record medium, a transducing means for each said record track responsive to the magnetization at any position thereof and producing electric signals proportional to said magnetic variations, a multiphase synchro-motor, means for applying each of said electric signals to a corresponding phase of said synchro-motor, output means driven by said synchro-motor, means driving said record medium comprising a motion-combining and summing mechanism which drives said record in proportion to the input motion and proportion to the synchro-motor output motion, a reversing mechanism between said synchro-motor and said motion-combining means, and sensing means engaging said record medium responsive to a characteristic thereof and actuating said reversing mechanism.

References Cited in the file of this patent

UNITED STATES PATENTS

| | | |
|---|---|---|
| 2,110,090 | Ligh et al. | Mar. 1, 1938 |
| 2,373,273 | Sziklai | Apr. 10, 1945 |
| 2,537,770 | Livingston et al. | Jan. 9, 1951 |
| 2,581,109 | Kenngott | Jan. 1, 1952 |
| 2,650,500 | Stibitz | Sept. 1, 1953 |
| 2,658,953 | Putzrath | Nov. 10, 1953 |
| 2,678,821 | Masterson | May 21, 1954 |
| 2,732,437 | Travis | Jan. 24, 1956 |

FOREIGN PATENTS

| | | |
|---|---|---|
| 721,391 | Great Britain | Jan. 5, 1955 |

UNITED STATES PATENT OFFICE
CERTIFICATION OF CORRECTION

Patent No. 2,948,467                                          August 9, 1960

Gary Muffly

It is hereby certified that error appears in the above numbered patent requiring correction and that the said Letters Patent should read as corrected below.

In the grant (only), line 1, name of inventor, for "Gary Muffy" read -- Gary Muffly --; column 3, line 42, for "picture" read -- pictured --; line 52, for "spide" read -- spider --; column 6, line 3, for "aganist" read -- against --; column 9, line 40, for "Those" read -- These --; column 11, line 20, for "elongatae" read -- elongate --.

Signed and sealed this 25th day of April 1961.

(SEAL)
Attest:

ERNEST W. SWIDER                                            DAVID L. LADD
Attesting Officer                                                Commissioner of Patents